(12) United States Patent
Michau et al.

(10) Patent No.: US 11,572,059 B2
(45) Date of Patent: Feb. 7, 2023

(54) METHOD AND CONTROL DEVICE FOR DETECTING, DURING THE OPERATION OF A HYBRID VEHICLE, WHETHER COMBUSTION IS TAKING PLACE IN AN INTERNAL COMBUSTION ENGINE OF THE HYBRID VEHICLE

(71) Applicant: Volkswagen Aktiengesellschaft, Wolfsburg (DE)

(72) Inventors: Peter Michau, Braunschweig (DE); Grit Freiwald, Gifhorn (DE); Juri Hopfauf, Lehrte (DE); Norbert Weiss, Sickte (DE); Christian Piasecki, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 593 days.

(21) Appl. No.: 16/074,218

(22) PCT Filed: Jan. 30, 2017

(86) PCT No.: PCT/EP2017/051958
§ 371 (c)(1),
(2) Date: Jul. 31, 2018

(87) PCT Pub. No.: WO2017/140485
PCT Pub. Date: Aug. 24, 2017

(65) Prior Publication Data
US 2020/0173503 A1 Jun. 4, 2020

(30) Foreign Application Priority Data
Feb. 18, 2016 (DE) ...................... 10 2016 202 556.2

(51) Int. Cl.
*B60W 20/50* (2016.01)
*F02D 41/22* (2006.01)
(Continued)

(52) U.S. Cl.
CPC ............ *B60W 20/50* (2013.01); *B60W 10/02* (2013.01); *B60W 10/06* (2013.01); *B60W 20/40* (2013.01);
(Continued)

(58) Field of Classification Search
None
See application file for complete search history.

(56) References Cited

U.S. PATENT DOCUMENTS 5,697,466 A * 12/1997 Moroto .................. B60K 6/547
 180/65.25
5,732,681 A * 3/1998 Ogita .................... F02D 41/126
 123/492

(Continued)

FOREIGN PATENT DOCUMENTS

CN 102171082 A 8/2011
CN 103133157 A 6/2013
(Continued)

OTHER PUBLICATIONS

Johnsson, Crankshaft speed measurements and analysis for control and diagnostics of diesel engines, Feb. 2001, Lulea University of Technology (Year: 2001).*
(Continued)

*Primary Examiner* — Christian Chace
*Assistant Examiner* — Scott R Jagolinzer
(74) *Attorney, Agent, or Firm* — Pearl Cohen Zedek Latzer Baratz LLP (57) ABSTRACT

A method to detect whether combustion is taking place in an internal combustion engine of a hybrid vehicle during opera-
(Continued)

tion of the hybrid vehicle, whereby a decoupler is provided between the internal combustion engine and an electric machine that serves to power the hybrid vehicle, comprising opening the decoupler between the internal combustion engine and the electric machine, receiving a speed signal when the decoupler is open, said signal indicating a rotational speed of the internal combustion engine when the decoupler is open, and determining, on the basis of the speed signal when the decoupler is open, whether combustion is taking place in the internal combustion engine. The present invention also relates to a control device to carry out the method according to the invention.

7 Claims, 3 Drawing Sheets (51) Int. Cl.
| | | |
|---|---|---|
| B60W 20/40 | (2016.01) | |
| B60W 10/06 | (2006.01) | |
| B60W 10/02 | (2006.01) | |
| B60K 6/387 | (2007.10) | |
| B60W 20/00 | (2016.01) | |
| F02D 41/14 | (2006.01) | |
| F16D 48/06 | (2006.01) | |
| B60K 6/24 | (2007.10) | |

(52) U.S. Cl.
CPC ..... *F02D 41/1454* (2013.01); *F02D 41/1497* (2013.01); *F02D 41/22* (2013.01); *F16D 48/06* (2013.01); *B60K 6/24* (2013.01); *B60K 6/387* (2013.01); *B60W 20/00* (2013.01); *B60W 2510/0638* (2013.01); *B60W 2510/0676* (2013.01); *B60W 2510/083* (2013.01); *B60Y 2200/92* (2013.01); *F02D 2041/228* (2013.01); *F02D 2200/021* (2013.01); *F02D 2200/101* (2013.01); *F16D 2500/10412* (2013.01); *F16D 2500/3064* (2013.01); *F16D 2500/3067* (2013.01)

(56) References Cited

U.S. PATENT DOCUMENTS

| | | | |
|---|---|---|---|
| 2003/0001390 A1 | 1/2003 | Phillips et al. | |
| 2008/0083579 A1* | 4/2008 | Okuda | B60W 30/194 |
| | | | 180/293 |
| 2009/0150019 A1* | 6/2009 | Sakamoto | B60W 30/188 |
| | | | 701/34.4 |
| 2011/0208379 A1* | 8/2011 | Otto | B60W 10/08 |
| | | | 701/22 |
| 2011/0208401 A1* | 8/2011 | Pantring | B60W 10/08 |
| | | | 701/101 |
| 2011/0224853 A1* | 9/2011 | Kieser | B60K 6/48 |
| | | | 701/22 |
| 2013/0144473 A1 | 6/2013 | Jeong | |
| 2013/0190962 A1* | 7/2013 | Yokouchi | B60W 10/06 |
| | | | 701/22 |
| 2013/0312504 A1* | 11/2013 | Bowman | F02D 41/0097 |
| | | | 73/114.05 |
| 2015/0032326 A1* | 1/2015 | Fushiki | B60L 50/10 |
| | | | 701/32.1 |
| 2017/0217427 A1* | 8/2017 | Wei | B60W 20/50 |

FOREIGN PATENT DOCUMENTS

| | | |
|---|---|---|
| CN | 103373345 A | 10/2013 |
| DE | 102 29 535 A1 | 1/2003 |
| DE | 10 2005 012 835 A1 | 3/2006 |
| DE | 10 2007 047 589 A1 | 4/2009 |
| DE | 10 2008 001 144 A1 | 10/2009 |
| DE | 10 2012 216 351 A1 | 6/2013 |
| DE | 10 2012 219 466 A1 | 4/2014 |
| DE | 10 2015 111 196 A1 | 1/2016 |
| EP | 0 437 057 A1 | 7/1991 |
| EP | 1 077 149 A2 | 2/2001 |
| EP | 1 110 800 A2 | 6/2001 |
| EP | 1 426 599 A1 | 6/2004 |
| EP | 2 685 429 A1 | 1/2014 |

OTHER PUBLICATIONS

Bahri et al., Understanding and detecting misfire in an HCCI engine fuelled with ethanol, Mar. 29, 2013, Elsevier, Applied Energy 108, pp. 24-33 (Year: 2013).*

Search report for German Patent Application No. 10 2016 202 556.2, dated Nov. 2, 2016.

International Search Report of PCT Application No. PCT/EP2017/051958, dated Apr. 6, 2017.

Office Action for Chinese Patent Application No. 201780010441.1, dated Sep. 30, 2020.

* cited by examiner

METHOD AND CONTROL DEVICE FOR DETECTING, DURING THE OPERATION OF A HYBRID VEHICLE, WHETHER COMBUSTION IS TAKING PLACE IN AN INTERNAL COMBUSTION ENGINE OF THE HYBRID VEHICLE

CROSS-REFERENCE TO RELATED APPLICATIONS

This application is a National Phase Application of PCT International Application No. PCT/EP2017/051958, International Filing Date Jan. 30, 2017, claiming priority of German Patent Application No. 10 2016 202 556.2, filed Feb. 18, 2016, which is hereby incorporated by reference.

FIELD OF THE INVENTION

The invention relates to a method and to a control device to detect whether combustion is taking place in an internal combustion engine of a hybrid vehicle during operation of the hybrid vehicle.

BACKGROUND OF THE INVENTION

Hybrid vehicles are characterized by two different types of drive systems which, depending on the situation, can be operated simultaneously, in other words, in the hybrid mode of operation, or else independently of each other. Hybrid vehicles often have an internal combustion engine and an electric drive as drive systems.

If the internal combustion engine cannot provide sufficient torque or any torque at all during the hybrid operation of a hybrid vehicle, for example, in case of a malfunction, if the vehicle was fueled incorrectly or the like, it can happen that the electric drive "carries along" the internal combustion engine. In such a case, a speed signal of the internal combustion engine is displayed to the driver who then assumes that the internal combustion engine is operating properly. However, since the electric drive is carrying along the internal combustion engine, the battery is quickly drained, which can cause the vehicle to come to a halt. If fuel is injected while the internal combustion engine is being unintentionally carried along, this fuel is not burned and it can accumulate in the exhaust gas system, for example, in a catalytic converter, damaging it if the fuel is ignited at a later point in time.

Various approaches are known that are aimed at reducing the likelihood of the internal combustion engine being unintentionally carried along by the electric drive. For instance, the internal combustion engine can be prevented from stalling, for example, by modifying the combustion parameters, as is described in European patent application EP 1 110 800 A2, or else this can be systematically controlled, as is described in German patent application DE 10 2007 047 589 A1. Moreover, various mechanisms are known as to how to respond to an actual or suspected stalling of the internal combustion engine, as is described in German patent application DE 10 2012 216 351 A1, in European patent application EP 2 685 429 A1 and in European patent application EP 1 077 149 A2.

Furthermore, there are various diagnostic possibilities which allow conclusions to be drawn about a faulty combustion in the internal combustion engine, for example, on the basis of the oil level, as described in European patent application EP 1 426 599 A1. However, the prior-art diagnostic possibilities cannot reliably detect all conceivable faults in the combustion in the internal combustion engine, especially the case in which no combustion whatsoever is taking place in the internal combustion engine or in any of the cylinders of the internal combustion engine.

SUMMARY OF THE INVENTION

The invention is based on the objective of putting forward a method and a control device to detect whether combustion is taking place in an internal combustion engine of a hybrid vehicle during operation of the hybrid vehicle, so that the above-mentioned drawbacks can be at least partially overcome.

This objective is achieved by means of the method according to the invention to detect whether combustion is taking place in an internal combustion engine of a hybrid vehicle during operation of the hybrid vehicle, according to claim 1, and by means of the control device to detect whether combustion is taking place in an internal combustion engine of a hybrid vehicle during operation of the hybrid vehicle, according to claim 10.

According to a first aspect of the invention, a method is provided to detect whether combustion is taking place in an internal combustion engine of a hybrid vehicle during operation of the hybrid vehicle, whereby a decoupler is provided between the internal combustion engine and an electric machine that serves to power the hybrid vehicle, comprising:

opening the decoupler between the internal combustion engine and the electric machine;
receiving a speed signal when the decoupler is open, said signal indicating a rotational speed of the internal combustion engine when the decoupler is open; and
determining, on the basis of the speed signal when the decoupler is open, whether combustion is taking place in the internal combustion engine.

According to a second aspect, the invention relates to a control device to detect whether combustion is taking place in an internal combustion engine of a hybrid vehicle during operation of the hybrid vehicle, whereby a decoupler is provided between the internal combustion engine and an electric machine that serves to power the hybrid vehicle, whereby the control device is configured to carry out a method according to the first aspect.

Other advantageous embodiments of the invention can be gleaned from the subordinate claims and from the description below of preferred embodiments of the present invention.

The present invention relates to a method to detect whether combustion is taking place in an internal combustion engine, for example, a gasoline engine or a diesel engine, of a hybrid vehicle during operation of the hybrid vehicle, especially during the hybrid mode of operation of the hybrid vehicle. The hybrid vehicle can be in operation when it is traveling in road traffic. For instance, the hybrid vehicle can be in operation after a first start of the internal combustion engine, whereby the first start is especially a start following a switched-off phase of the internal combustion engine, whereby the ignition of the hybrid vehicle can be deactivated during the switched-off phase, which can last, for example, a few minutes or longer. For instance, the hybrid vehicle can be in operation when the hybrid vehicle is in a driving mode which encompasses not only driving phases in which the hybrid vehicle is moving at speeds of more than 0 km/hr, but also stopping phases due to traffic conditions, for example, at intersections or due to obstacles on the road. A hybrid vehicle with automatic transmission can be in operation when a gear is engaged after the first start.

A decoupler is provided between the internal combustion engine and an electric machine that serves to power the hybrid vehicle, for instance, an electric motor that is configured to power the hybrid vehicle. The decoupler is preferably configured to mechanically couple the internal combustion engine and the electric machine to each other when said decoupler is in a closed state and to physically decouple them completely from each other when it is in an open state. Therefore, the hybrid vehicle has a so-called idle mode of the internal combustion engine in which the internal combustion engine is idling when said decoupler is decoupled from the electric machine. The decoupler can preferably be controlled, for instance, by means of a regulatable electric motor.

In accordance with the method according to the invention, in order to detect whether combustion is taking place in the internal combustion engine of the hybrid vehicle, the decoupler situated between the internal combustion engine and the electric machine is opened and, when the decoupler is open, a speed signal is received that indicates the rotational speed of the internal combustion engine when the decoupler is open. Receiving the speed signal can mean that the speed signal is received, for example, from a measuring device or from a processing unit. Receiving the speed signal can also comprise the measurement of the speed signal by means of a measuring device and/or the conversion of the measured speed signals into one or more data streams by means of the processing unit. The measuring device can be a speed sensor such as, for instance, a magneto-static speed sensor. The magneto-static speed sensor can have, for example, a transmitter wheel having a plurality of magnetic segments or teeth and a magnetic field sensor such as, for instance, a Hall sensor. The transmitter wheel can be attached at any desired position of a crankshaft of the internal combustion engine, e.g. between two cylinders of the internal combustion engine or between the internal combustion engine and the decoupler. The processing unit can have a microprocessor. When the decoupler is open, the speed signal can be a signal that is only received if the decoupler is open. As an alternative, when the decoupler is open, the speed signal can be an interval of a signal, whereby the decoupler is open during this interval and the signal is received continuously, irrespective of whether the decoupler is open or closed.

On the basis of the speed signal when the decoupler is open, it is then determined whether combustion is taking place in the internal combustion engine. In particular, it is determined whether combustion is taking place in one or in all of the cylinders of the internal combustion engine, or whether no combustion is taking place in any of the cylinders of the internal combustion engine. This determination of whether combustion is taking place in the internal combustion engine can be carried out, for instance, on the basis of an idling speed of the internal combustion engine, as will be described below.

The method according to the invention can reliably prevent that it is erroneously determined that no combustion is taking place in the internal combustion engine, even though the internal combustion engine is not malfunctioning or combustion is actually taking place in the internal combustion engine. Consequently, back-up measures—which are normally initiated when it is determined that no combustion is taking place in the internal combustion engine—can be prevented from being unjustifiably initiated. These back-up measures include electric propulsion, especially with a power limitation, the activation of an electric power control system (EPC system), the activation of an engine malfunction indication lamp (MIL) or other back-up measures.

The opening of the decoupler constitutes a modification of the driving strategy since, during the time it takes to receive the speed signal when the decoupler is open and to determine whether combustion is taking place in the internal combustion engine, the hybrid mode of operation of the hybrid vehicle is switched over to a purely electric mode of operation.

Opening the decoupler, receiving the speed signal when the decoupler is open and determining whether combustion is taking place in the internal combustion engine on the basis of the speed signal when the decoupler is open will also be referred to below as an active diagnosis as to whether combustion is taking place in the internal combustion engine.

In some embodiments, the method to detect whether combustion is taking place in the internal combustion engine during operation of the hybrid vehicle can also encompass that, when the decoupler is closed, an analysis is conducted as to whether there is an indication that combustion is absent in the internal combustion engine. If it is detected here that there is an indication that combustion is absent, the decoupler is opened. Otherwise, the analysis is repeated as to whether there is an indication that combustion is absent in the internal combustion engine. The indication that combustion is absent can involve, for example, that, within the scope of a passive diagnosis as to whether combustion is taking place in the internal combustion engine, it is detected that no combustion is taking place in the internal combustion engine. In the case of the passive diagnosis as to whether combustion is taking place in the internal combustion engine, there is preferably no modification of the driving strategy.

Passive diagnoses as to whether combustion is taking place in the internal combustion engine can be erroneous, especially if no combustion is taking place in any of the cylinders or in all of the cylinders of the internal combustion engine. For this reason, a passive diagnosis as to whether combustion is taking place in the internal combustion engine is preferably carried out continuously during the operation of the hybrid vehicle and, as soon as the passive diagnosis has determined that no combustion is taking place in the internal combustion engine, the active diagnosis can check whether the passive diagnosis is correct, whereby, on the basis of the speed signal when the decoupler is open, said active diagnosis determines whether combustion is taking place in the internal combustion engine.

Since the active diagnosis is only started once the passive diagnosis has detected that no combustion is taking place in the internal combustion engine, the modification of the driving strategy can be reduced to those cases in which the passive diagnosis has detected that presumably no combustion is taking place in the internal combustion engine. As a result, it can be reliably ruled out that unwarranted back-up measures are initiated in those cases in which no combustion is taking place in the internal combustion engine, even though the internal combustion engine is not defective.

In some embodiments, the analysis as to whether there is an indication that combustion is absent in the internal combustion engine when the decoupler is closed can be conducted on the basis of a speed signal, especially a high-resolution speed signal, that indicates the current rotational speed of the internal combustion engine when the decoupler is closed. For instance, on the basis of a speed increase in increments, it can be analyzed whether there is an indication that combustion is absent in the internal combustion engine. In this context, it can be determined, for example, whether a crankshaft angle at which a cylinder of the internal combustion engine is at a given position, for example, at its upper dead center, coincides with a crankshaft angle at which the high-resolution speed signal has an extreme value, for example, a minimum value. If these coincide, it can be determined that it is probable that no combustion is taking place in the internal combustion engine.

As an alternative or in addition, the analysis as to whether there is an indication that combustion is absent in the internal combustion engine can be carried out on the basis of a lambda signal of a lambda sensor when the decoupler is closed, said signal representing the current lambda value of a lambda sensor of the hybrid vehicle when the decoupler is closed. In this context, it can be detected, for example, whether the current lambda value is outside of a prescribed lambda value range in spite of the adapted combustion parameters and, if the current lambda value is outside of the prescribed lambda value range, it is probable that no combustion is taking place in the internal combustion engine. If, in contrast, the current lambda value is within the prescribed lambda value range, it can be determined that combustion is taking place in the internal combustion engine.

As an alternative or in addition, the analysis as to whether there is an indication that combustion is absent in the internal combustion engine can be carried out on the basis of a torque signal that indicates the current torque value of the electric machine when the decoupler is closed. For instance, the analysis as to whether there is an indication that combustion is absent can involve the execution of a momentary speed plausibilization. In this context, it can be detected whether the current torque of the electric machine when the drive clutch is open between the internal combustion engine and the electric machine on the one hand and a drive axle of the hybrid vehicle on the other hand has exceeded an expected torque of the electric machine, said torque depending especially on the ambient conditions of the electric machine and, if the current torque exceeds the expected torque, it can be determined that it is probable that no combustion is taking place in the internal combustion engine. In contrast, if the current torque is equal to or smaller than the expected torque, it can be determined that it is probable that combustion is taking place.

As an alternative or in addition, the analysis as to whether there is an indication that combustion is absent in the internal combustion engine can be carried out on the basis of the engine temperature, especially the course of the engine temperature. For instance, it can be determined that no combustion is taking place in the internal combustion engine if it is detected that the engine temperature has exceeded a prescribed maximum temperature or has exceeded it for a prescribed period of time.

For example, it can be determined that no combustion is taking place in the internal combustion engine if it is detected that a speed increase in increments is within a prescribed range, that the current lambda value is outside of the prescribed lambda value range and that the current torque has exceeded the expected torque. Only then can the active diagnosis be initiated in this example.

In some embodiments, the decoupler can be opened if, during a combustion cycle, the passive diagnosis detects that there is an indication that combustion is absent in the internal combustion engine. As an alternative, the decoupler can be opened if, during several, e.g. three, consecutive combustion cycles, the passive diagnosis detects that there is an indication that combustion is absent in the internal combustion engine. This increases the probability that, during the passive diagnosis, it is detected that no combustion is taking place in the internal combustion engine and that the internal combustion engine is actually defective. Consequently, the start of the active diagnosis and thus a modification of the driving strategy can be postponed.

If, during the passive diagnosis in a combustion cycle that follows a combustion cycle in which it was erroneously detected that no combustion is taking place in the internal combustion engine it is detected that combustion is taking place in the internal combustion engine, then an active diagnosis can be dispensed with and it can be assumed that the internal combustion engine is not defective. The driving strategy can remain unaltered until the probability that no combustion is taking place in the internal combustion engine is greater than the threshold probability. Only then can the active diagnosis be initiated. This makes it possible to increase the driving comfort and to prevent an erroneous detection indicating that no combustion is taking place.

In some embodiments, when the decoupler is open, the determination on the basis of the speed signal as to whether combustion is taking place in the internal combustion engine can comprise that the rotational speed of the internal combustion engine when the decoupler is open is compared to a prescribed limit rotational speed and that it is determined that no combustion is taking place in the internal combustion engine if the rotational speed of the internal combustion engine is lower than the prescribed limit rotational speed. The prescribed limit rotational speed can be lower than the idling speed of the internal combustion engine, for example, by at least 10% lower than the idling speed of the internal combustion engine.

In some embodiments, the method to detect whether combustion is taking place in an internal combustion engine of a hybrid vehicle during operation of the hybrid vehicle can also comprise that the internal combustion engine is stopped after the decoupler has been opened and is then restarted with the decoupler open. When the internal combustion engine is stopped, the internal combustion engine can be switched off, in particular, the fuel injection as well as the mass flow through the internal combustion engine can be interrupted and the combustion in the internal combustion engine can be stopped. When the internal combustion engine is restarted, a so-called idle start can be carried out, that is to say, a start of the internal combustion engine in the idling mode of operation or with the decoupler open. After the restart, when the clutch is open, it can be determined on the basis of the speed signal whether the rotational speed of the internal combustion engine rises above the prescribed limit rotational speed, especially up to the idling speed of the internal combustion engine. If the rotational speed does not rise above the prescribed limit rotational speed, it can be detected that no combustion is taking place in the internal combustion engine and thus that the internal combustion engine is defective. Otherwise, it can be detected that combustion is taking place in the internal combustion engine and that it is not defective.

As an alternative, there is no need to stop the internal combustion engine. Instead, after the decoupler has been opened, it can be detected whether the rotational speed of the internal combustion engine has fallen below the prescribed limit rotational speed, especially below the idling speed of the internal combustion engine. If the rotational speed only drops to the idling speed, that is to say, when the decoupler is open, if the internal combustion engine remains at the idling speed or rises above it again, it can be detected that combustion is taking place in the internal combustion engine and that it is not defective. If the rotational speed falls below the prescribed limit rotational speed, especially when "stalling" of the internal combustion engine is detected, it can be determined that no combustion is taking place in the internal combustion engine and thus that the internal combustion engine is defective.

On the basis of the speed signal when the decoupler is open, it can be very reliably detected whether combustion is taking place in the internal combustion engine. Therefore, as a result, back-up measures owing to the absence of combustion are only initiated if the internal combustion engine is indeed defective.

In some embodiments, it can be determined that no combustion is taking place in the internal combustion engine if the rotational speed of the internal combustion engine is lower than the prescribed limit rotational speed after a prescribed period of time after the decoupler was opened. The prescribed period of time can depend on the rotational speed of the internal combustion engine before the decoupler is opened or, if the internal combustion engine is stopped and restarted after the decoupler has been opened, on the point in time of the restart. The prescribed period of time can be within a range from 0.1 s to 30 s, preferably from 0.5 s to 15 s.

In some embodiments, if it has been determined that no combustion is taking place in the internal combustion engine, a driver information signal can be generated which indicates that no combustion is taking place in the internal combustion engine. For example, as a result of the driver information signal, a display, for instance, the engine control lamp, can be activated. Then it can be indicated to the driver that and, if applicable, which back-up measures are activated and/or that the driver should go to a repair garage.

As an alternative or in addition, additional back-up measures are initiated if it is detected that no combustion is taking place in the internal combustion engine. For instance, the hybrid vehicle can then be operated purely electrically, whereby especially a power limitation occurs.

As an alternative or in addition, if it is detected that no combustion is taking place in the internal combustion engine, the internal combustion engine can be restarted and it can be determined whether combustion is taking place in the internal combustion engine after the restart of the internal combustion engine. If the rotational speed of the internal combustion engine rises above the prescribed limit rotational speed, it can be detected that combustion is taking place in the internal combustion engine and it is not defective. Otherwise, back-up measures of the type described above can be initiated.

In some embodiments, the decoupler can be closed if it is detected that combustion is taking place in the internal combustion engine. For this purpose, before the decoupler is closed, the internal combustion engine can be synchronized to the transmission speed and the decoupler can be closed as soon as the rotational speed of the internal combustion engine essentially matches the transmission speed. Subsequently, the hybrid vehicle can be operated in the hybrid mode of operation. During this mode of operation, a passive diagnosis can once again be carried out as to whether combustion is taking place in the internal combustion engine.

The described method can be employed analogously to vehicles having an internal combustion engine and an additional drive device that is connected to the internal combustion engine via a decoupler. The additional drive device can be, for instance, a hydrogen drive or another type of drive device.

The present invention also relates to a control device to detect whether combustion is taking place in an internal combustion engine of a hybrid vehicle during operation of the hybrid vehicle, whereby a decoupler is provided between the internal combustion engine and an electric machine that serves to power the hybrid vehicle. The control device is configured to open the decoupler between the internal combustion engine and the electric machine on the basis of a decoupler control signal, to receive a speed signal that indicates the rotational speed of the internal combustion engine when the decoupler is open and, on the basis of the speed signal when the decoupler is open, to determine whether combustion is taking place in the internal combustion engine. In particular, the control device is configured to carry out the above-described method to detect whether combustion is taking place in the internal combustion engine of a hybrid vehicle during operation of the hybrid vehicle.

The control device can have a processor, for instance, a microprocessor, that is configured to carry out the described method to detect whether combustion is taking place in the internal combustion engine of a hybrid vehicle during operation of the hybrid vehicle. The control device can also have a data storage unit in which a program is preferably stored that contains instructions for the processor in order to control the processor by means of the described method. Moreover, prescribed parameters for carrying out the described method, for instance, the prescribed limit rotational speed, the prescribed period of time and/or other parameters can all be stored in the data storage unit.

The control device can have a number of signal inputs and signal outputs. For example, the speed signal when the decoupler is open, the speed signal when the decoupler is closed, the lambda signal, the torque signal and/or other signals can all be received via the signal inputs. Especially the decoupler, and optionally the transmission of the motor vehicle, can be controlled and/or the driver information signal can be transmitted via the signal outputs.

The control device can be integrated into an engine control unit or transmission control unit of the motor vehicle.

The present invention also relates to a motor vehicle, for instance, a hybrid vehicle. The hybrid vehicle has an internal combustion engine, an electric machine that serves to power the hybrid vehicle and that is connected to the internal combustion engine via a decoupler; it also has a control device of the type described in the preceding passages as well as a speed sensor. For instance, the hybrid vehicle can be a full hybrid vehicle or a plug-in hybrid vehicle. The speed sensor can be configured as described above in conjunction with the method according to the invention.

Instead of the electric machine, the motor vehicle can have a hydrogen drive, another internal combustion engine or another type of drive system.

BRIEF DESCRIPTION OF THE DRAWINGS

Embodiments of the invention will now be described by way of examples, making reference to the accompanying drawings. The following is shown.

DETAILED DESCRIPTION OF THE INVENTION

Figure 1:
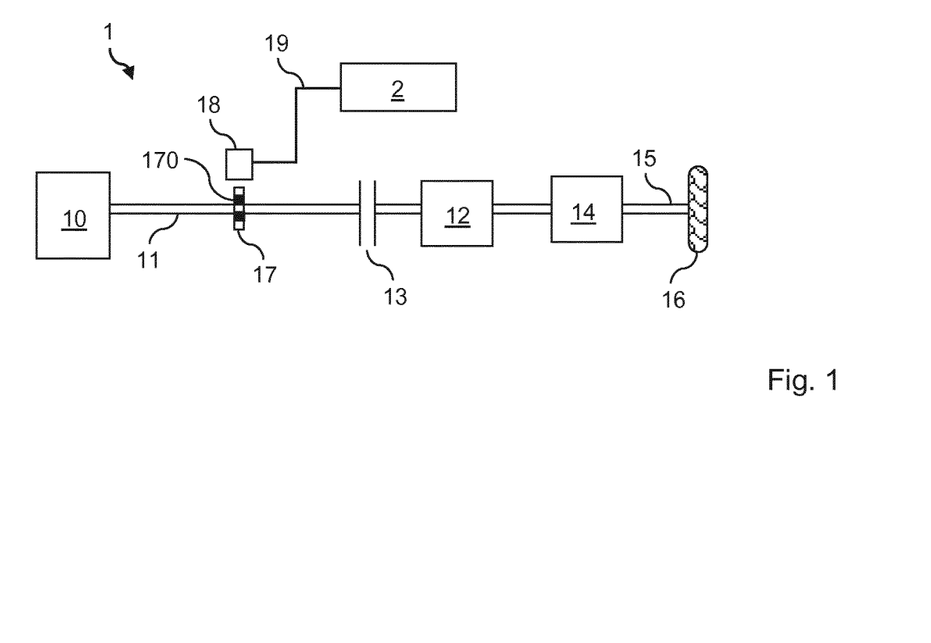
FIG. 1 is an embodiment of a drive train of a hybrid vehicle, in a schematic view.

FIG. 1 shows an embodiment of a drive train 1 of a hybrid vehicle. The drive train 1 of the hybrid vehicle comprises an internal combustion engine 10 having a crankshaft 11, an electric drive 12 and a decoupler 13 by means of which the electric drive 12 is connected to the crankshaft 11 of the internal combustion engine 10. The internal combustion engine 10 and the electric drive 12 are coupled via a transmission 14 to a drive axle 15 that is connected to wheels 16 of the hybrid vehicle. The transmission 14 is, for example, a dual-clutch transmission.

The drive train 1 also comprises a speed sensor that has a transmitter wheel 17 with fifty-eight teeth 170 and a Hall sensor 18. The transmitter wheel 17 is attached to the crankshaft 11 between the internal combustion engine 10 and the decoupler 13. The Hall sensor 18 scans the transmitter wheel during one rotation of the crankshaft 11 and generates a high-resolution, oscillating speed signal. The speed signal of the Hall sensor 18 is conveyed via a data bus 19 to a control device 2.

The control device 2 is configured to carry out a method 3, 4 which is described below with reference to FIGS. 3 and 4 and which serves to detect whether combustion is taking place in an internal combustion engine of a hybrid vehicle during operation of the hybrid vehicle.

Figure 2:
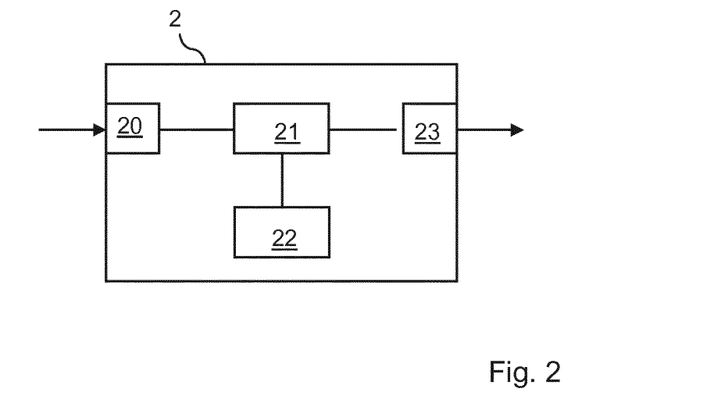
FIG. 2 is an embodiment of a control device according to the invention, in a schematic view.

As shown in FIG. 2, the control device 2 has a signal input 20 that can be connected to the data bus 19 and that can receive the speed signal via the control device 2. The control device 2 also has a processor 21 that is connected to the signal input 20, a data storage unit 22 that is connected to the processor 21 and a signal output 23 that is connected to the processor 21. A program that contains instructions for the processor 21 so that the processor can be controlled by means of one of the methods 3, 4 is stored in the data storage unit 22. The processor 21 is a microprocessor which is configured to carry out the method 3, 4 that serves to detect whether combustion is taking place in an internal combustion engine of a hybrid vehicle during operation of the hybrid vehicle. The signal output 23 can be connected to a control motor or to an actuator (not shown here) of the decoupler 13 in order to transmit a control signal to open or close the decoupler, and it can be connected to a display in order to transmit a driver information signal and to show the driver that the internal combustion engine is defective since no combustion is taking place in the internal combustion engine.

Figure 3:
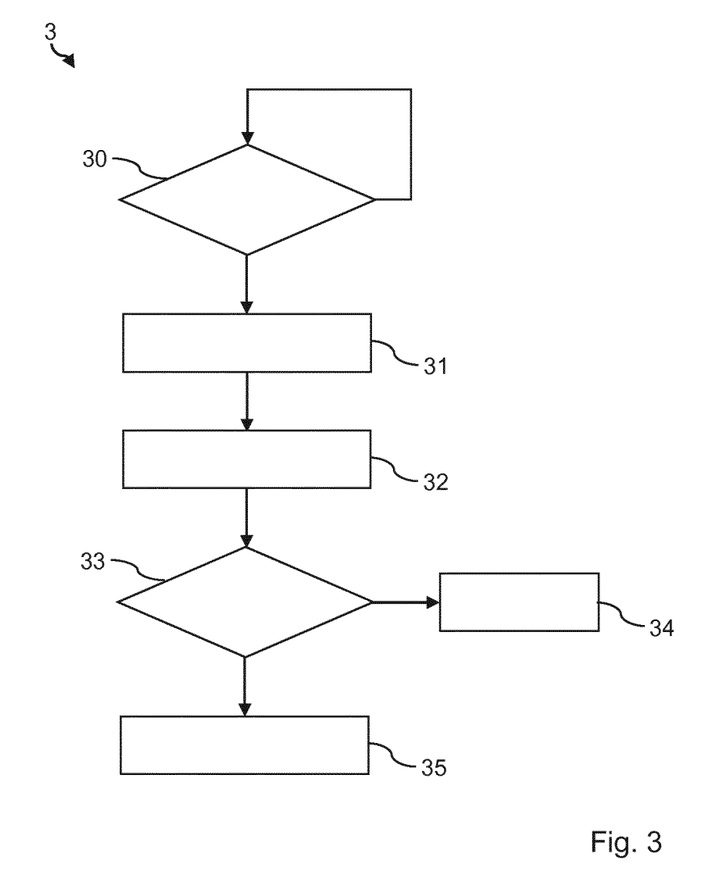
FIG. 3 is a flow diagram of a first embodiment of a method according to the invention to detect whether combustion is taking place in an internal combustion engine.

FIG. 3 shows a flow diagram of a first embodiment of a method 3 according to the invention to detect whether combustion is taking place in an internal combustion engine.

In 30, a passive diagnosis is carried out as to whether combustion is taking place in the internal combustion engine. In this process, for example, when the decoupler is closed, the speed sensor receives a high-resolution speed signal that indicates the rotational speed of the internal combustion engine as a function of a crankshaft angle, and subsequently determines whether a crankshaft angle at which a cylinder of the internal combustion engine is at its upper dead center coincides with a crankshaft angle at which the high-resolution speed signal exhibits a minimum value. If the crankshaft angles differ, then the passive diagnosis indicates that combustion is probably taking place in the internal combustion engine. However, if the crankshaft angles coincide, then the passive diagnosis indicates that it is probable that no combustion is taking place in the internal combustion engine.

If it is detected in 30 that combustion is taking place in the internal combustion engine, then the passive diagnosis is repeated in 30.

If it is detected in 30 that no combustion is taking place in the internal combustion engine, then the decoupler between the internal combustion engine and the electric drive is opened in 31. For this purpose, a control signal is transmitted to the control motor or to the actuator of the decoupler, said signal causing the control motor or the actuator to open the decoupler.

In 32, when the decoupler is open, the speed sensor receives a speed signal that indicates the rotational speed of the internal combustion engine when the decoupler is open.

In 33, it is determined whether combustion is taking place in the internal combustion engine. For this purpose, after the decoupler has been opened, it is detected whether the rotational speed of the internal combustion engine after 3 seconds has dropped to approximately the idling speed of the internal combustion engine or to approximately 0 rpm. If the rotational speed has dropped only to the idling speed, it is determined that combustion is taking place in the internal combustion engine. If, in contrast, the rotational speed has dropped to about 0 rpm, it is determined that no combustion is taking place in the internal combustion engine.

If it is determined in 33 that combustion is taking place in the internal combustion engine, then the decoupler is closed in 34. For this purpose, before the decoupler is closed, the internal combustion engine is synchronized to the transmission speed and, as soon as the rotational speed of the internal combustion engine approximately matches the transmission speed, a control signal is transmitted to the control motor or to the actuator of the decoupler, said signal causing the control motor or the actuator to close the decoupler. After the decoupler has been closed, the hybrid vehicle is once again operated in the hybrid mode of operation.

If it is determined in 33 that no combustion is taking place in the internal combustion engine, then back-up measures are initiated in 35. The back-up measures comprise a switch-over to a purely electric mode of operation of the hybrid vehicle with a power limitation in order to extend the range that can be driven in the electric mode of operation and to display driver information indicating that the driver should go to a repair garage. In order to display the driver information, an appropriate driver information signal is transmitted to a display device.

Figure 4:
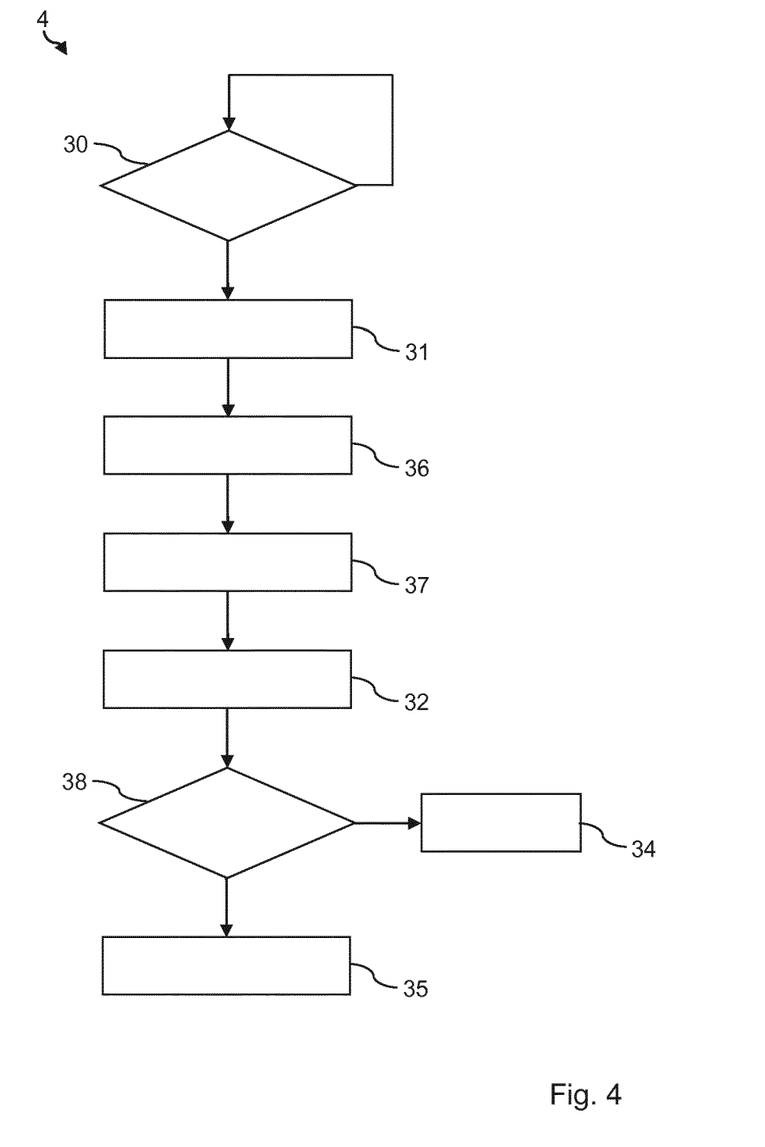
FIG. 4 is a flow diagram of a second embodiment of a method according to the invention to detect whether combustion is taking place in an internal combustion engine.

FIG. 4 shows another embodiment of a method 4 to detect whether combustion is taking place in the internal combustion engine during operation of the hybrid vehicle.

In 30, as described in conjunction with FIG. 3, a passive diagnosis is carried out as to whether combustion is taking place in the internal combustion engine. If it is detected in 30 that combustion is taking place in the internal combustion engine, then the passive diagnosis is repeated in 30.

If it is detected in 30 that no combustion is taking place in the internal combustion engine, then in 31, as described in conjunction with FIG. 3, the decoupler between the internal combustion engine and the electric drive is opened.

In 36, the internal combustion engine is stopped. For this purpose, the internal combustion engine is switched off in that the fuel injection as well as the mass flow through the internal combustion engine are interrupted.

In 37, the internal combustion engine is restarted. In this context, the internal combustion engine is started in the idling mode of operation when the decoupler is open.

In 32, as described in conjunction with FIG. 3, a speed signal is received when the decoupler is open.

In 38, it is determined whether no combustion is taking place in the internal combustion engine. For this purpose, after the restart of the internal combustion engine, it is determined whether the rotational speed of the internal combustion engine has risen to approximately the idling speed of the internal combustion engine. If the rotational speed has not risen to the idling speed, it is determined that no combustion is taking place in the internal combustion engine. Otherwise, if the rotational speed has risen to the idling speed, it is determined that combustion is taking place in the internal combustion engine.

If it is determined in 38 that combustion is taking place in the internal combustion engine, then in 34, the decoupler is closed, as described in conjunction with FIG. 3.

If it is determined in 38 that no combustion is taking place in the internal combustion engine, then in 35, back-up measures are initiated, as described in conjunction with FIG. 3.

LIST OF REFERENCE NUMERALS

1 drive train
10 internal combustion engine
11 crankshaft
12 electric drive
13 decoupler
14 transmission with drive clutch
15 drive axle
16 wheel
17 transmitter wheel
170 teeth of the transmitter wheel
18 Hall sensor
19 data bus
2 control device
20 signal input
21 processor
22 data storage unit
23 signal output
3, 4 method to detect whether combustion is taking place in the internal combustion engine
30 conducting a passive diagnosis as to whether combustion is taking place in the internal combustion engine
31 opening the decoupler
32 receiving a speed signal when the decoupler is open
33 determining whether combustion is taking place in the internal combustion engine
34 closing the decoupler
35 initiating back-up measures
36 stopping the internal combustion engine
37 restarting the internal combustion engine
38 determining whether combustion is taking place in the internal combustion engine

The invention claimed is:

1. A method to detect whether combustion is taking place in an internal combustion engine of a hybrid vehicle during operation of the hybrid vehicle, whereby a decoupler is provided between the internal combustion engine and an electric machine that serves to power the hybrid vehicle, and whereby a speed sensor is provided between the internal combustion engine and the decoupler, comprising:

determining, according to a passive diagnosis during which the decoupler is closed, whether there is an indication that combustion is absent in the internal combustion engine by analyzing, using the speed sensor, a rotational speed of the internal combustion engine as a function of a crankshaft angle, when, according to the passive diagnosis, it is determined that no combustion is taking place in the internal combustion engine:

opening the decoupler between the internal combustion engine and the electric machine;

stopping fuel injection and mass flow into the internal combustion engine after the decoupler has been opened, and restarting the internal combustion engine while the decoupler is still open;

after the internal combustion engine has been restarted and while the decoupler is still open, receiving a speed signal from the speed sensor when the decoupler is open, said speed signal indicating a rotational speed of the internal combustion engine when the decoupler is open; and determining, on the basis of the speed signal when the decoupler is open, whether combustion is taking place in the internal combustion engine.

2. The method according to claim 1, whereby the determining as to whether there is the indication that combustion is absent in the internal combustion engine is further made on the basis of at least one of the following signals:

when the decoupler is closed, on the basis of a lambda signal of a lambda sensor representing a lambda value of the lambda sensor of the hybrid vehicle when the decoupler is closed;

on the basis of a torque signal that indicates the torque value of the electric machine when the decoupler is closed; and/or on the basis of the engine temperature.

3. The method according to claim 1, wherein the determination as to whether combustion is taking place in the internal combustion engine comprises:

that, when the decoupler is open, the rotational speed of the internal combustion engine is compared to a prescribed limit rotational speed of the internal combustion engine; and that it is determined that no combustion is taking place in the internal combustion engine if the rotational speed of the internal combustion engine is lower than the prescribed limit rotational speed.

4. The method according to claim 3, whereby it is determined that no combustion is taking place in the internal combustion engine if the rotational speed of the internal combustion engine is lower than the prescribed limit rotational speed after a prescribed period of time after the decoupler was opened.

5. The method according to claim 1, whereby, if it has been determined that no combustion is taking place in the internal combustion engine, a driver information signal is generated which indicates that no combustion is taking place in the internal combustion engine.

6. The method according to claim 1, whereby, if it is determined that combustion is taking place in the internal combustion engine, the decoupler is closed.

7. A control device to detect whether combustion is taking place in an internal combustion engine of a hybrid vehicle during operation of the hybrid vehicle, whereby a decoupler is provided between the internal combustion engine and an electric machine that serves to power the hybrid vehicle, whereby a speed sensor is provided between the internal combustion engine and the decoupler, and whereby the control device is configured to carry out a method according to claim 1.

* * * * *